(12) United States Patent
Vedula et al.

(10) Patent No.: US 8,250,633 B2
(45) Date of Patent: Aug. 21, 2012

(54) TECHNIQUES FOR FLEXIBLE RESOURCE AUTHENTICATION

(75) Inventors: Srinivas Vedula, Orem, UT (US); Larry Hal Henderson, Orem, UT (US); Stephen Kent Winn, Orem, UT (US)

(73) Assignee: EMC Corporation, Hopkinton, MA (US)

( * ) Notice: Subject to any disclaimer, the term of this patent is extended or adjusted under 35 U.S.C. 154(b) by 1090 days.

(21) Appl. No.: 11/924,744

(22) Filed: Oct. 26, 2007

(65) Prior Publication Data

US 2009/0113523 A1    Apr. 30, 2009

(51) Int. Cl.
*H04L 9/32* (2006.01)
*H04L 9/00* (2006.01)
*G06F 7/04* (2006.01)

(52) U.S. Cl. ........... 726/5; 726/3; 726/4; 726/6; 726/27; 726/28; 713/168; 713/169; 713/170; 713/171; 713/172

(58) Field of Classification Search .................. 726/5
See application file for complete search history.

(56) References Cited

U.S. PATENT DOCUMENTS

| | | | |
|---|---|---|---|
| 5,481,720 A | 1/1996 | Loucks et al. | |
| 5,913,025 A | 6/1999 | Higley et al. | |
| 6,263,369 B1 * | 7/2001 | Sitaraman et al. | 709/225 |
| 7,137,008 B1 | 11/2006 | Hamid et al. | |
| 7,191,466 B1 | 3/2007 | Hamid et al. | |
| 7,237,256 B2 * | 6/2007 | Cheng et al. | 726/3 |
| 2004/0215980 A1 | 10/2004 | Hamid | |
| 2005/0108579 A1 | 5/2005 | Isaacson et al. | |
| 2005/0172116 A1 * | 8/2005 | Burch et al. | 713/155 |
| 2006/0288229 A1 | 12/2006 | Hamid et al. | |
| 2007/0199053 A1 | 8/2007 | Sandhu et al. | |
| 2007/0208744 A1 | 9/2007 | Krishnaprasad et al. | |

* cited by examiner

*Primary Examiner* — Longbit Chai
(74) *Attorney, Agent, or Firm* — Barry N. Young (57) ABSTRACT

In various embodiments, techniques for flexible resource authentication are provided. A principal attempts to login to a target resource using first credentials. The target resource does not recognize the first credentials and in response thereto forwards the first credentials to an identity service. The identity service authenticates the principal via the first credentials and supplies second credentials to the target resource. The target resource recognizes and authenticates the second credentials and grants access to the principal.

23 Claims, 4 Drawing Sheets

TECHNIQUES FOR FLEXIBLE RESOURCE AUTHENTICATION

BACKGROUND

Today, enterprises and their users are becoming increasingly more mobile and more geographically dispersed. The Internet; World-Wide Web (WWW); more powerful and yet smaller devices; and secure communication protocols, such as Secure Sockets Layer (SSL) have permitted enterprises and their users to conduct business in a secure manner from virtually any point on the globe.

One side effect of this mobility is the increased administration and support for individuals who access secure networks, applications, and devices over these networks. Typically, a single user may have a variety of different user accounts for a variety of different applications/devices. Each user account is typically addressed by authentication mechanisms that are local to the application/device being accessed. That is, control over access is managed at the site of the application or at the device, and access is based on a specific user account that is making the access request.

Thus, a large distributed enterprise, with a variety of devices and applications, maintains a plethora of authentication mechanisms for its applications/devices and a myriad of user accounts for a single user.

From the perspective of the enterprise, this arrangement is time consuming, support intensive, and cost ineffective. Furthermore, from the perspective of the user, this arrangement is cumbersome requiring the user to remember and personally manage a variety of credentials for access to various portions of the enterprise's network.

Moreover, and often for security reasons, a user must change credentials every so often; this situation compounds the difficulty a user encounters in managing a myriad of credentials for a variety of applications/devices.

Accordingly, what are needed are more flexible mechanisms for user authentication.

SUMMARY

In various embodiments, techniques for flexible resource authentication are provided. More specifically, and in an embodiment, a method is provided for flexible resource authentication. An unrecognized login attempt is received from a principal. The unrecognized login attempt includes unrecognized credentials that the principal uses in an attempt to access a target resource. The unrecognized credentials are forwarded to an external and remote identity service to process on behalf of the target resource. Next, recognized credentials are acquired and then authenticated for access to the target resource. The recognized credentials are received from the identity service. Finally, the principal is granted access to the target resource in response to the recognized credentials being authenticated by the target resource.

DETAILED DESCRIPTION

The term "resource" as used herein refers to an electronic entity, an application or set of applications, a data store, a path to a set of other resources, a user, a proxy, a directory, a service, or physical devices such as computers or peripherals etc. Resources may represent physical or logical entities.

In an embodiment, a "principal" is a specific type of resource, such as a user or an automated service that assumes its own unique identity within a given processing context or environment. That identity can be authenticated via credentials so that a given resource can be assured that a particular principal is who it purports to be and so that the principal and actions of the principal can be authorized and trusted.

An identity refers to an electronic identifier, attribute, or representation for a resource (e.g., physical and logical). An identity may be assigned to a resource after authentication. An identity is authenticated via various techniques (e.g., challenge and response interaction, cookies, assertions, etc.) that use various identifying information (e.g., identifiers with passwords, biometric data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

The terms "remote" and "local" are used throughout this disclosure. These terms are relative terms that define a particular resource as being local or remote to another resource. Something is considered remote if that something exists over network in a different environment entirely from that of something else to which it is being compared.

The embodiments of the invention can be implemented in a variety of architectural platforms, directories, proxies (reverse, forward, and/or transparent) operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
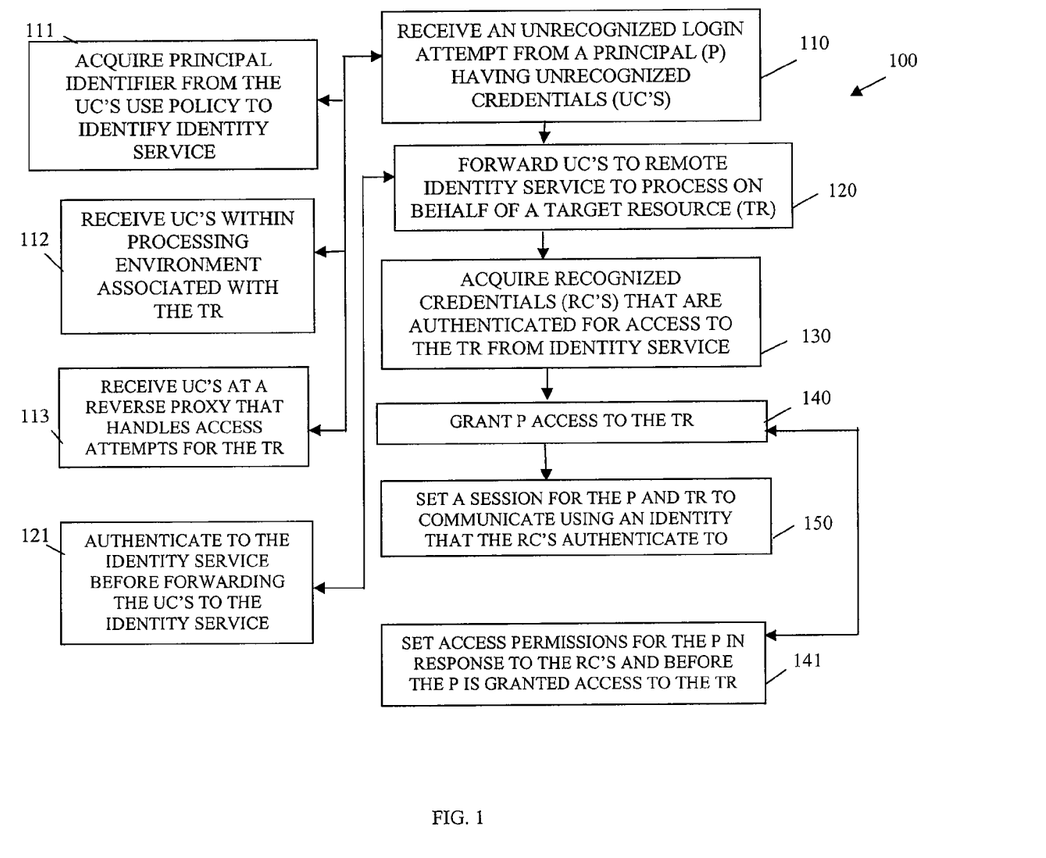
FIG. 1 is a diagram of a method for flexible resource authentication, according to an example embodiment.

FIG. 1 is a diagram of a method 100 for flexible resource authentication, according to an example embodiment. The method 100 (hereinafter "target resource authentication service") is implemented as instructions in a machine-accessible and readable medium. The instructions when executed by a machine perform the processing depicted in the FIG. 1. The target resource authentication service is also operational over and performs within a network. The network may be wired, wireless, or a combination of wired and wireless.

Initially, a principal (e.g., user or automated service) desires to access a target resource, such as a service, device, peripheral, secure website, etc. Access to the target resource requires a specific type of authentication defined by the target resource. The target resource authentication service sits on or in front of the target resource and ensure that the specific type of authentication is complied with and performs the novel processing described more completely herein and below.

At 110, the target resource authentication service receives an unrecognized login attempt made from a principal over a network connection, such as a wide-area network (WAN) or Internet connection. That login attempt includes a principal identifier for the principal and unrecognized credentials. The credentials are unrecognized to the target resource authentication service. The principal is attempting to log into and access the target resource using the principal identifier and the unrecognized credentials.

In some cases, at 111, the target resource authentication service acquires a principal identifier from the unrecognized credentials. This principal identifier is then used to acquire or access a specific policy. The policy identifies for the target resource authentication service a specific identity service to use for attempting to authenticate the principal for access to the target resource. The processing and interaction with the identity service is discussed more completely below.

According to an embodiment, at 112, the unrecognized credentials are received by the target resource authentication service within a processing environment or on a particular device/service that is associated with the target resource that the principal is attempting to log into.

In another case, at 113, the target resource authentication service receives the unrecognized credentials at a reverse proxy that handles access attempts, which are made for the target resource.

So, the login attempt and the unrecognized credentials supplied by a principal attempting to access the target resource can be processed on a device associated with the target resource or processed on a reverse proxy that acts on behalf of the target resource. In this manner, the target resource does not have to be modified or even be aware of the processing taking place on its behalf. In fact, and in some cases, the target resource can be a legacy resource that has access offloaded and handled by the target resource authentication service.

At 120, target resource authentication service determines that the login attempt by the principal and the unrecognized credentials cannot be processed or handled locally for authentication to the target resource. As a result, the target resource authentication service forwards the unrecognized credentials to a remote and external identity service over the network connection.

The target resource authentication service may be in pre-existing and current trusted and secure communication relationship with the identity service before the unrecognized credentials are forwarded to the identity service. Alternatively, at 121, the target resource authentication service authenticates itself to the identity service before forwarding the unrecognized credentials to the identity service.

At 130, the target resource authentication service acquires recognized credentials from the identity service. In some cases, the target service accepts the recognized credentials without performing any additional authentication. In other cases, which are the subject of the embodiments discussed herein, the recognized credentials are credentials that the target resource recognizes and can authenticate for purposes of permitting the principal to access the target service. That is, the target service includes an authentication mechanism or service that permits the recognized credentials to be authenticated and thereby provide access to the principal. The principal was unaware of the recognized credentials and originally supplied just the unrecognized credentials. The unrecognized credentials were authenticated via the identity service to authenticate the principal and then policy managed by the identity service permitted the identity service to supply recognized credentials on behalf of the principal that permits the principal to authenticate to and gain access to the target resource.

Accordingly, at 140, and in response to the recognized credentials, the target resource authentication service grants the principal access to the target resource.

In an embodiment, at 141, the target resource authentication service uses another policy in response to the recognized credentials to set access permission or perhaps an access role for the principal and before the principal is actually granted access at 140.

In another case, at 150, the target resource authentication service sets a session for the principal and the target resource to communicate with one another using an identity that the recognized credentials authenticate to. So, the recognized credentials map to a known identity that the target resource recognizes. That known identity includes access permissions and/or roles and they are set for a communication session between the principal and the target resource.

Figure 2:
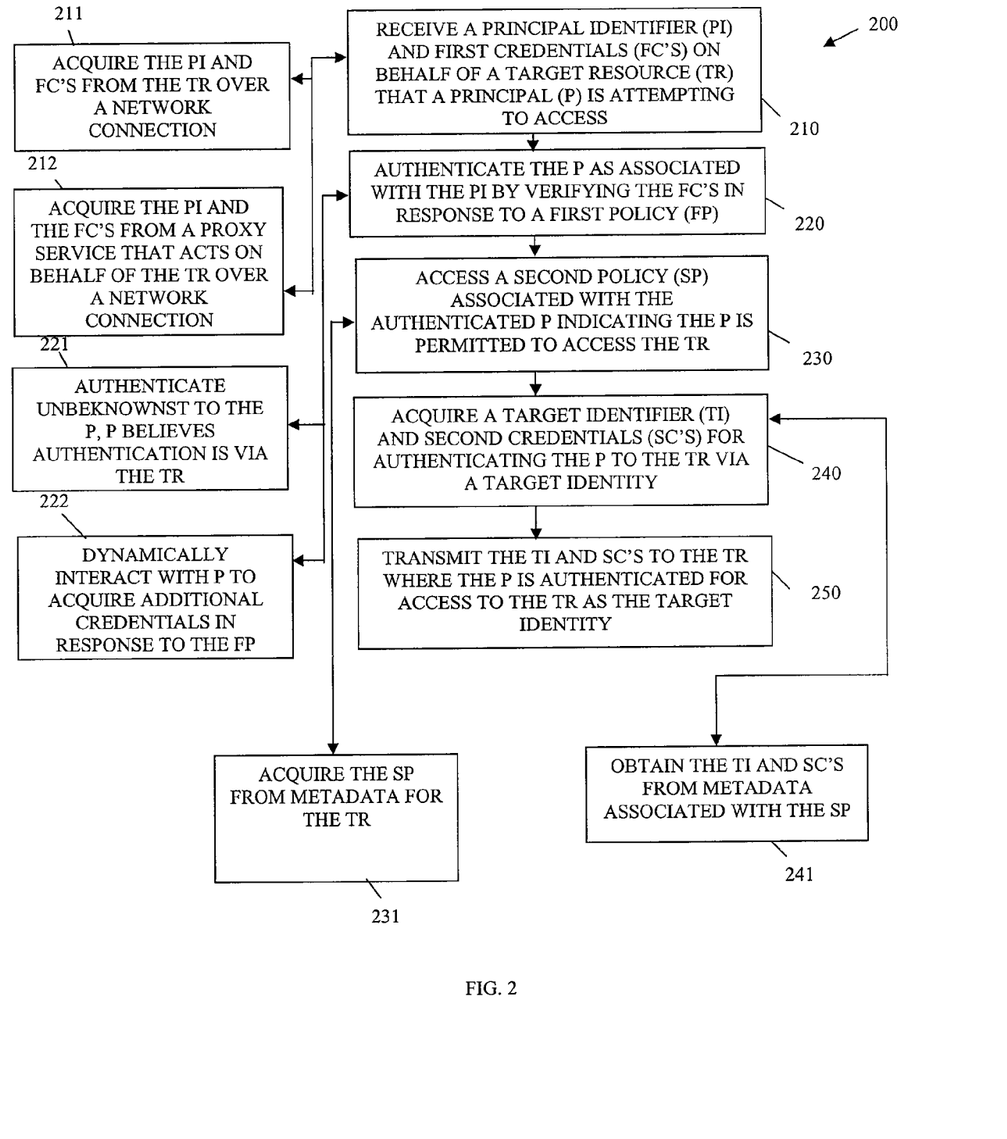
FIG. 2 is a diagram of another method for flexible resource authentication, according to an example embodiment.

FIG. 2 is a diagram of another method 200 for flexible resource authentication, according to an example embodiment. The method 200 (hereinafter "identity service") is implemented as instructions in a machine-accessible and readable medium. The instructions when executed by a machine perform the functions depicted in the FIG. 2. The processing is also operational over and performs within a network. The network may be wired, wireless, or a combination of wired and wireless.

The identity service is the external and remote authentication service that interacts with the target resource authentication service, which was presented in detail above with reference to the method 100 of the FIG. 1.

At 210, the identity service receives a principal identifier and first credentials on behalf of a target resource that a principal is attempting to access with the principal identifier and with the first credentials. The target resource does not recognize the principal identifier and the first credentials. Conventionally, at this point the login attempt being made by the principal would fail because the principal identifier and the first credentials are not recognizable by the target resource. However, policy administered by the identity service and as described more completely below permits the principal to acquire the proper credentials and proper identity and successfully log into the target resource.

In an embodiment, at 211, the identity service acquires the principal identifier and the first credentials from the target resource over a network connection, such as a secure Internet connection via a Virtual Private Network (VPN) or via SSL communications.

In another case, at 212, the identity service acquires the principal identifier and the first credentials from a proxy service that acts on behalf of the target resource over the network connection.

At 220, the identity service authenticates the principal as being associated with the principal identifier by verifying the first credentials in response to a first policy.

In some cases, at 221, the identity service authenticates the principal in a manner that may be unknown or unbeknownst to the principal. That is, the principal submits the principal identifier and the first credentials to the target resource believing that the principal is authenticating directly to the target resource when in fact this is intercepted and forwarded to the identity service and the identity service authenticates the principal via the principal identifier and the first credentials.

According to another embodiment, at 222, the identity service dynamically interacts with the principal to acquire additional credentials in response to the first policy. So, the first policy may require the principal to supply some other credentials to the identity service before the identity service permits the principal to be properly authenticated to the target resource.

At 230, the identity service accesses a second policy associated with the now authenticated principal. The second policy informs or instructs the identity service that the principal is permitted to access the target resource.

In an embodiment, at 231, the identity service acquires the second policy from metadata associated with the target resource. In some cases, the metadata may be stored in a directory object that the identity service dynamically acquires after authenticating the principal via the initial principal identifier and first credentials.

At 240, the identity service acquires a target identifier and second credentials for authenticating the principal to the target resource via a target identity. So, the target resource permits a particular target identity to access the target resource when that target identity supplies the target identifier and the second credentials. This information is managed by the identity service on behalf of the target resource.

According to an embodiment, at 241, the identity service obtains the target identifier and the second credentials from secure metadata associated with the second policy. So, the actual target identifier and second credentials may be encrypted or secured within metadata associated with the second policy and acquired by the identity service on behalf of the target resource to permit the principal to use the target identity when interacting with the target resource.

At 250, the identity service transmits the target identifier and the second credentials to the target resource. At this point in time, the principal is authenticated for access to the target resource as the target identity. The target resource or an authentication service on behalf of the target resource authenticates the target identifier and the second credentials and recognizes the principal as the target identity and provides access to the target resource.

It is now appreciated how target resources on a network may continue to recognize and authenticate principals (users and automated services) for access via their pre-existing accounts and authentication mechanisms and at the same time a requesting principal may gain that access using an entirely different account, set of credentials, and authentication mechanism that is not known and not recognized by the target resource. This is done via an intermediary, such as the identity service in the manners described above. This significantly improves support and maintenance issues for an enterprise and also simplifies processing for the principal who only has to remember and manage a single identifier and set of credentials.

Figure 3:
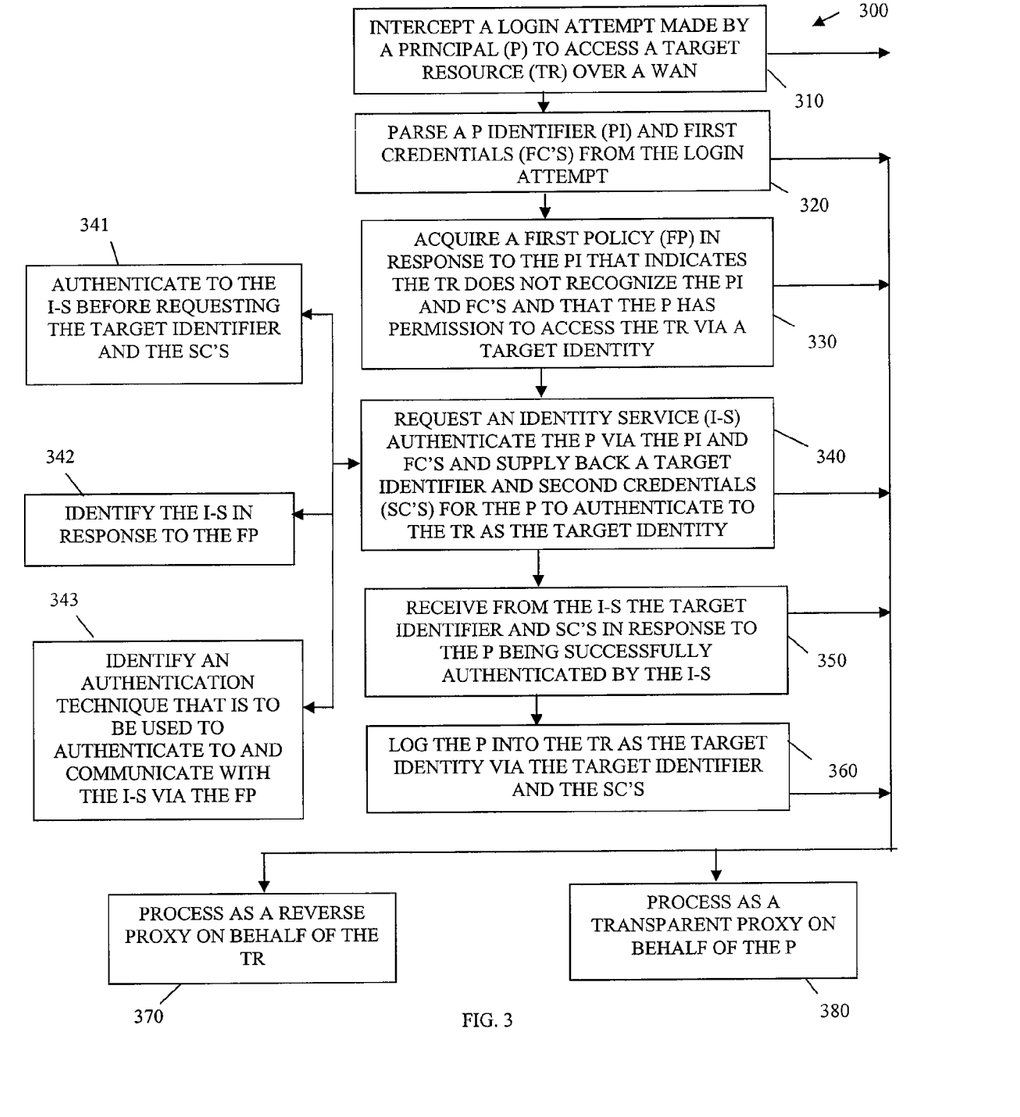
FIG. 3 is a diagram of yet another method for flexible resource authentication, according to an example embodiment.

FIG. 3 is a diagram of yet another method 300 for flexible resource authentication, according to an example embodiment. The method 300 (hereinafter "proxy service") is implemented as instructions in a machine-accessible and readable medium. The instructions when executed by a machine perform the functions depicted in the FIG. 3. The processing is also operational over and performs within a network. The network may be wired, wireless, or a combination of wired and wireless.

The proxy service presents a particular intermediary service that intercepts access attempts made by principals to a target resource. So, in some cases the proxy service may be viewed as an enhanced and alternative arrangement to what was shown above with respect to the method 100 of the FIG. 1. Moreover, similar to the method 100, the proxy service interacts with the processing associated with the identity service represented by the method 200 of the FIG. 2.

At 310, the proxy service intercepts a login attempt made by a principal to access a target resource over a network, such as but not limited to the Internet. The principal may be entirely unaware that the login attempt was intercepted by the proxy. That is, the principal believes it is directly contacting and logging into the target resource for access.

At 320, the proxy service parses information supplied by the principal with the login attempt to acquire a principal identifier and first credentials.

At 330, the proxy service acquires a first policy in response to the principal identifier. The first policy instructs the proxy service or informs the proxy service that target resource does not recognize the principal identifier and the first credentials. The first policy also instructs or informs the proxy service that the principal is still permitted to access the target resource via a target identity; one that the principal did not originally supply.

At 340, the proxy service makes a request to an identity service via the network connection for the identity service to authenticate the principal via the principal-supplied identifier and first credentials. The request also ensures that if the principal is successfully authenticated and if policy permits that the proxy service receives back a target identifier and second credentials for the principal to authenticate to the target resource as the target identity.

According to an embodiment, at 341, the proxy service authenticates to the identity service before requesting the target identifier and the second credentials.

In some cases, the proxy service may have a selection of identity services that can be used to make the request for authentication of the principal. In such a situation, at 342, the proxy service identifies the identity service to make the request of in response to the first policy. That is, the first policy provides a reference to the identity service that the proxy service is to use for authentication of the principal.

In still another situation, at 343, the proxy service can identify an authentication technique that is to be used to authenticate to and communicate with the identity service via the first policy. So, the authentication mechanism for authenticating to the identity service can also be identified in the first policy or via the first policy.

At 350, the proxy service receives back from the identity service the target identifier and second credentials in response to the principal being successfully authenticated by the identity service. In other words, if the identity service is successful in authenticating the principal via the original principal identifier and the first credentials and if policy permits, the identity service provides back to the proxy service, on behalf of the principal, the target identifier and the second credentials for the proxy service to supply to the target resource.

At 360, the proxy service logs the principal into the target resource as the target identity via the target identifier and the second credentials. At this point, the target resource believes it is interacting with the target identity and the principal believes that it logged into the target resource via the original principal identifier and first credentials. The proxy service facilitated this processing via interactions with the identity service. Example processing associated with the identity service was described in detail above with reference to the method 200 of the FIG. 2.

According to an embodiment, at 370, the proxy service is implemented as and processes as a reverse proxy on behalf of the target resource. The target resource can be aware or configured for this arrangement. Alternatively, the target resource can be unaware and not pre-configured for this arrangement.

In another situation, at 380, the proxy service is implemented as and processes as a transparent proxy on behalf of the principal. In such a situation, the principal's environment is unaware of the proxy service and not pre-configured for the arrangement.

So, the proxy service can be implemented within the environment of the target resource or within the environment of the principal.

Figure 4:
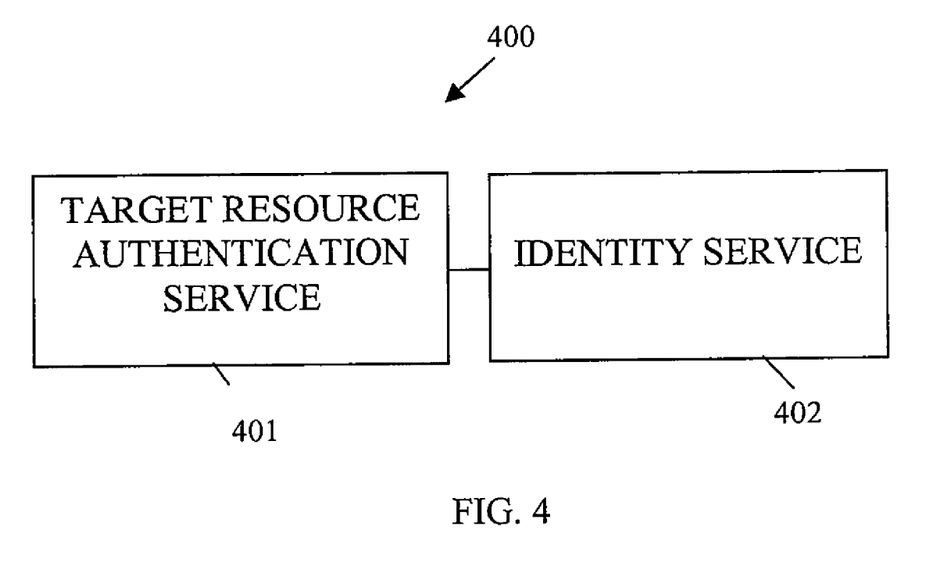
FIG. 4 is a diagram of a flexible authentication system, according to an example embodiment.

FIG. 4 is a diagram of a flexible authentication system 400, according to an example embodiment. The flexible authentication system 400 is implemented as instructions in machine-accessible and computer-readable media and is to process on one or more machines (processing devices, such as a computer) over a network. Thus, the flexible authentication system 400 is operational over and performs within a network. The network may be wired, wireless, or a combination of wired and wireless. The flexible authentication system 400 implements among other things the methods 100, 200, and 300 of the FIGS. 1-3, respectively.

The flexible authentication system 400 includes target resource authentication service 401 and an identity service 402. Each of these and their interactions with one another over a network is now discussed in turn.

The target resource authentication service 401 is implemented in a machine-accessible and computer-readable medium and is to process on a target machine (computer, processing device, etc.) over a network connection. Example processing associated with the target resource authentication service 401 was described in detail above with reference to the method 100 and the method 300 of the FIGS. 1 and 3, respectively.

The target resource authentication service 401 controls access to a target resource, which is associated with the target machine or target processing environment. The target resource authentication service 401 uses a policy to determine whether unrecognized credentials for an unrecognized principal identifier, which is associated with a principal, are to be provided to the identity service 402.

The identity service 402 is implemented in a machine-accessible and readable medium and is to process on a different machine of the network; a machine that is different from that which processes the target resource authentication service 401. Example processing associated with the identity service 402 was presented in detail above with reference to the method 200 of the FIG. 2. Moreover, example identity services that can be modified to provide the features of the identity service 402 were described and incorporated by reference herein and above.

The identity service 402 authenticates the unrecognized principal identifier for the principal using the unrecognized credentials. The identity service 402 does recognize the credentials and the identifier; however, these items are labeled as unrecognized because from the viewpoint of the target resource authentication service 401 they continue to remain unrecognized.

The identity service 402, after successful authentication of the principal via the unrecognized principal identifier and the unrecognized credentials, supplies back to the target resource authentication service 401 recognized credentials for a recognized identifier. Again, these credentials and identifier are labeled as recognized since from the perspective of the target resource authentication service 401 these items are now recognized and capable of being processed to authenticate the principal as a recognized target identity for access to the target resource.

The principal gains access to the target resource by initially supplying unrecognized credentials and an unrecognized identifier. The target resource authentication service 401 forwards this to the identity service 402. The identity service authenticates the principal using those items and uses policy to provided back to the target resource authentication service 401 a recognized identifier and recognized credentials for the target identity. This permits the principal to gain access to the target resource as the target identity.

According to an embodiment, the target resource authentication service 401 is implemented as a proxy that performs authentication on behalf of the target machine and target resource and other target machines having other target resources. So, the target resource authentication service 401 can service multiple machines and resources.

In an embodiment, the target resource authentication service 401 acquires the policy metadata for the target resource.

In another situation, the principal supplies the unrecognized identifier and credentials to the target resource and these items are intercepted by the target resource authentication service 401 unbeknownst to the principal. This can occur when the target resource authentication service 401 is implemented as a reverse proxy for the target resource or as a transparent proxy for the principal.

In another case, the unrecognized credentials and identifier may be associated with a first authentication mechanism while the recognized credentials and recognized identifier are associated with a second authentication mechanism. The two authentication mechanisms are entirely different from one another.

It is now fully appreciated how flexible authentication mechanisms can be achieved. An enterprise can streamline different authentication requirements for different resources via an identity service acting as an intermediary. The requesting principals maintain a single identifier and credentialing information for access to a plurality of resource, each potentially having its own separate and different authentication mechanisms. The identity service authenticates the principals via the information they supply and then provides back valid credentials and identifiers for access to a target resource using that target resource's authentication mechanism. This streamlines authentication management from the perspective of the enterprise and from the perspective of the principal.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
configuring at least one processing device, situated on or in front of a target resource, to perform the functions of:
receiving an unrecognized login attempt from a principal having unrecognized credentials in an attempt to access the target resource, the target resource is a legacy resource that is unmodified and unaware of the processing for the method;
forwarding the unrecognized credentials to an external and remote proxy identity service to process on behalf of the target resource;
acquiring recognized credentials that are then authenticated for access to the target resource, wherein the recognized credentials are received from the proxy identity service and the unrecognized credentials are entirely different from the recognized credentials and the recognized credentials used with an authentication mechanism for the target resource that is entirely different from another authentication mechanism used by the remote proxy identity service to authenticate the principal via the unrecognized credentials; and
granting the principal access to the target resource, wherein permitting the principal to access said target resource using a target identity, a principal identifier and the recognized credentials received from said proxy identity service for said target resource and a target identifier and the unrecognized credentials transmitted to said proxy identity service.

2. The method of claim 1 further comprising, setting access permissions for the principal in response to the recognized credentials and before the principal is granted access to the target resource.

3. The method of claim 1, wherein receiving further includes acquiring from the unrecognized credentials a principal identifier and using a policy associated with the principal identifier to identify the identity service to request authentication assistance from.

4. The method of claim 1, wherein receiving further includes, receiving the unrecognized credentials within a processing environment associated with the target resource.

5. The method of claim 1, wherein receiving further includes, receiving the unrecognized credentials at a reverse proxy that handles access attempts for the target resource.

6. The method of claim 1, wherein forwarding further includes authenticating to the identity service before forwarding the unrecognized credentials.

7. The method of claim 1 further comprising, setting a session for communication between the principal and the target resource using an identity that the recognized credentials authenticate to.

8. A machine-implemented method, comprising:
configuring at least one processing device to perform the functions of:
receiving a principal identifier and first credentials on behalf of a target resource that a principal is attempting to access with the principal identifier and with the first credentials, and wherein the target resource does not recognize the principal identifier and the first credentials;
authenticating the principal as being legitimately associated with the principal identifier by verifying the first credentials in response to a first policy;
accessing a second policy associated with the authenticated principal that indicates the principal is permitted to have access to the target resource;
acquiring a target identifier and second credentials for authenticating the principal to the target resource as a target identity in response to the second policy, the target identifier and the second credentials are entirely different from the principal identifier and the first credentials, and an authentication mechanism used for the target resource to authenticate for access to the target resource is entirely different from another authentication mechanism used to authenticate the principal via the principal identifier and the first credentials; and
transmitting the target identifier and the second credentials, which are then recognized and authenticated by the target resource and which permit the principal to access the target resource using the target identity, the principal identifier and the first credentials received from a reverse proxy for the target resource and the target identifier and the second credentials transmitted to the reverse proxy, the target resource is a legacy resource that is unmodified to interact with the reverse proxy.

9. The method of claim 8, wherein receiving further includes acquiring the principal identifier and first credentials from the target resource over a network connection.

10. The method of claim 8, wherein receiving further includes acquiring the principal identifier and first credentials from a proxy service that acts on behalf of the target resource over a network connection.

11. The method of claim 8, wherein authenticating further includes authenticating the principal unbeknownst to the principal, wherein the principal attempts to directly authenticate to the target resource using the principal identifier and the first credentials and the principal is unaware of being redirected from the target resource and subsequently being authenticated to the target resource as the target identity.

12. The method of claim 8, wherein authenticating further includes dynamically interacting with the principal to acquire additional credentials to properly perform authentication of the principal and in response to the first policy.

13. The method of claim 8, wherein accessing further includes acquiring the second policy from metadata associated with the target resource.

14. The method of claim 8, wherein acquiring further includes obtaining the target identifier and the second credentials from metadata associated with the second policy.

15. A machine-implemented method, comprising:
intercepting, at a reverse proxy, a login attempt being made by a principal to access a target resource over a network connection, the reverse proxy is situated on or in front of a device associated with the target resource and the target resource is unaware of the reverse proxy and is a legacy resource that is unmodified to interact with the reverse proxy;

parsing a principal identifier and first credentials from the login attempt;

acquiring a first policy in response to the principal identifier that indicates the target resource does not recognize the principal identifier and the first credentials and that the principal has permission to access the target resource via a different target identity;

requesting that an identity service authenticate the principal via the principal identifier and the first credentials and that the identity service supply back a target identifier and second credentials for the principal to authenticate to the target resource as the target identity;

receiving from the identity service the target identifier and the second credentials in response to the principal being successfully authenticated by the identity service, the target identifier and the second credentials are entirely different from the principal identifier and the first credentials, and an authentication mechanism used for the target resource to authenticate for access to the target resource is entirely different from another authentication mechanism used by the identity service to authenticate the principal via the principal identifier and the first credentials; and logging the principal into the target resource as the target identity via the target identifier and the second credentials, wherein permitting the principal to access said target resource using a target identity, the principal identifier and the first credentials received from said reverse proxy for said target resource and the target identifier and the second credentials transmitted to the said reverse proxy.

16. The method of claim 15 further comprising, authenticating to the identity service before requesting the target identifier and the second credentials.

17. The method of claim 15, wherein requesting further includes identifying the identity service in response to the first policy.

18. The method of claim 17, wherein requesting further identifying an authentication technique that is to be used to authenticate to and communicate with the identity service via the first policy.

19. A machine-implemented system, comprising:

a target resource authentication service implemented in a machine-accessible and readable medium and to processing on a target machine over a network; and an identity service implemented in a machine-accessible and readable medium to process on a different machine of the network, wherein the target resource authentication service controls access to a target resource of the target machine and the target resource authentication service uses a policy to determine whether unrecognized credentials for an unrecognized principal identifier are to be supplied to the identity service, the identity service authenticates the unrecognized principal identifier via the unrecognized credentials and supplies the target resource authentication service with recognized credentials for a recognized identifier associated with a target identity and the target resource authentication service authenticates the target identity for access to the target identity via the recognized credentials and recognized identifier, wherein a principal associated with the unrecognized identifier and the target identifier gains access to the target resource by supplying the unrecognized identifier and unrecognized credentials via the interaction between the target resource authentication service and the identity service and the dictates of the policy, the recognized identifier and the recognized credentials are entirely different from the unrecognized principal identifier and the unrecognized credentials, and an authentication mechanism used by the target resource authentication service to authenticate for access to the target resource is entirely different from another authentication mechanism used by the identity service to authenticate the principal via the unrecognized principal identifier and the unrecognized credentials, the target resource is a legacy resource that is unaware of the target resource authentication service and unmodified to interact with the target resource authentication service and the target resource is a legacy resource that is situated on a device or in front of the device that processes the target resource, wherein permitting the principal to access said target resource using the target identity, the principal identifier and the recognized credentials received from a reverse proxy for said target resource and the target identifier and the second credentials transmitted to said reverse proxy.

20. The system of claim 19, wherein the target resource authentication service is implemented as a proxy that performs authentication on behalf of the target machine and target resource and other target machines having other target resources.

21. The system of claim 20, wherein the principal supplies the unrecognized identifier and unrecognized credentials to the target resource and they are intercepted by the target resource authentication service unbeknownst to the principal.

22. The system of claim 19, wherein the target resource authentication service acquires the policy as directory metadata associated with a directory entry for the target resource.

23. The system of claim 19, wherein the unrecognized credentials are associated with a first authentication mechanism that is different from a second authentication mechanism that the target resource authentication service uses with the recognized credentials.

* * * * *